May 6, 1924.

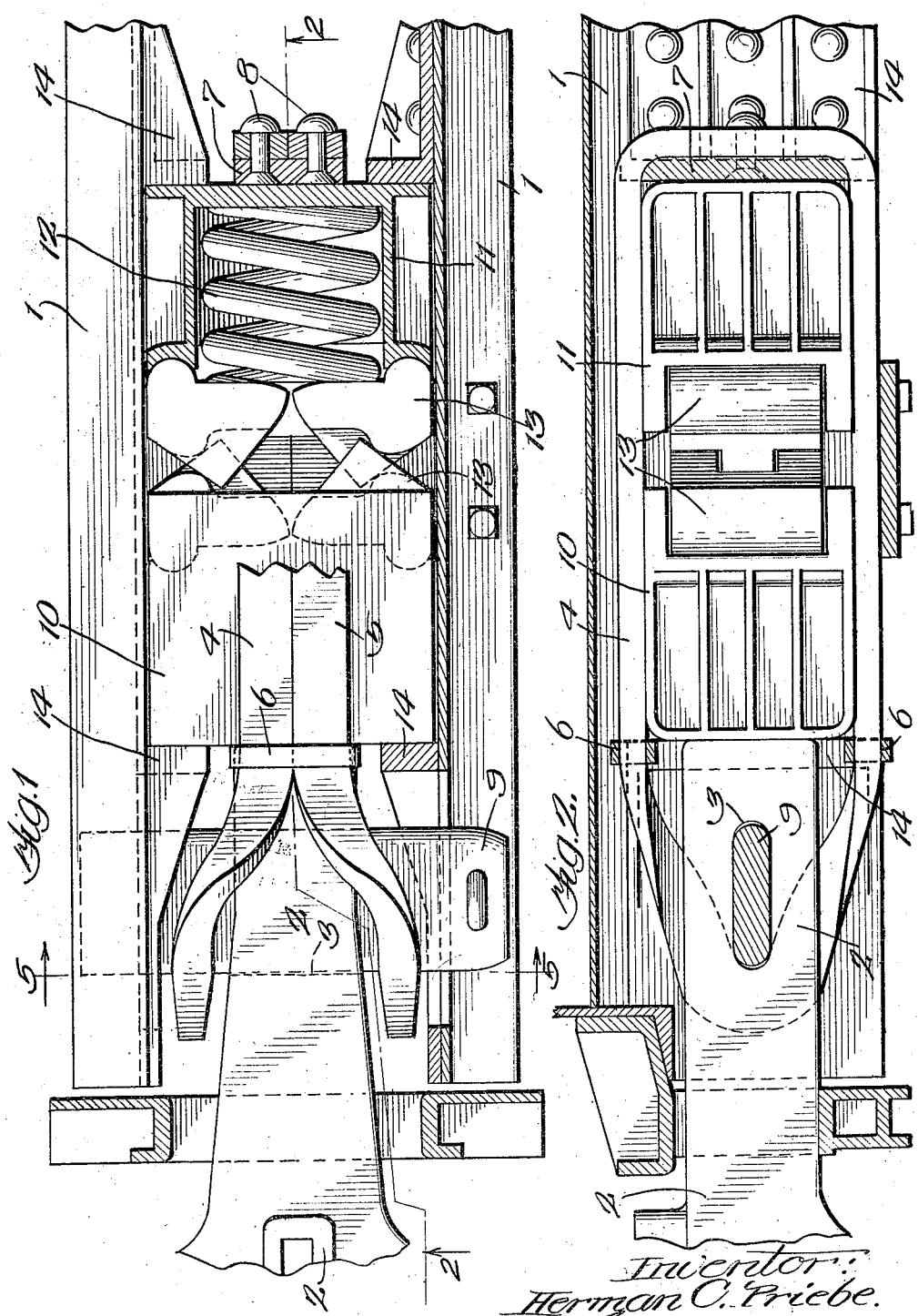

H. C. PRIEBE

DRAFT GEAR

Filed March 16, 1922    2 Sheets-Sheet 2

1,493,127

Inventor.
Herman C. Priebe.
By L. L. Bragg Atty.

Patented May 6, 1924.

1,493,127

UNITED STATES PATENT OFFICE.

HERMAN C. PRIEBE, OF BLUE ISLAND, ILLINOIS.

DRAFT GEAR.

Application filed March 16, 1922. Serial No. 544,183.

*To all whom it may concern:*

Be it known, that I, HERMAN C. PRIEBE, citizen of the United States, residing at Blue Island, in the county of Cook and State of Illinois, have invented a certain new and useful Improvement in Draft Gears, of which the following is a full, clear, concise, and exact description.

My invention relates to draft gears and has for its object an improvement in the construction of the yoke portions thereof. The coupler yoke of my invention is in the form of a link having its outer end bifurcated, the branches of this bifurcated end of the yoke being spread apart sidewise of the draft gear and embracing the coupler stem. There is a key slot in the stem and a key passing through this slot and through the outer end of the yoke opening. Any suitable form of motion resisting mechanism is surrounded by the yoke.

In the preferred embodiment of the invention the link is of composite formation, there being two assembled similarly placed links that enter into its construction. These component links are made of bars that are oblong in cross section, the wide faces of the sides of the links being horizontal. The compenent links are spread apart at their outer ends laterally of the gear to constitute the bifurcated end of the yoke hitherto described.

Figure 3:
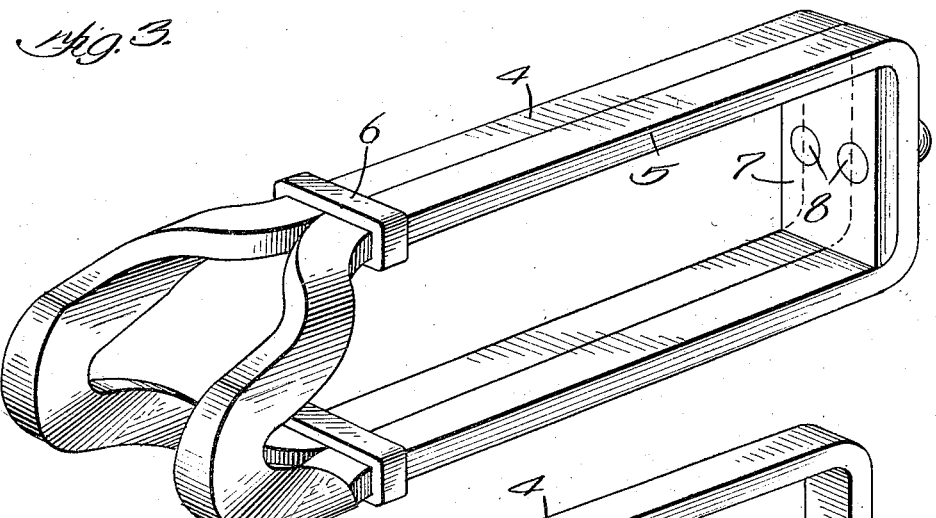
Figure 4:
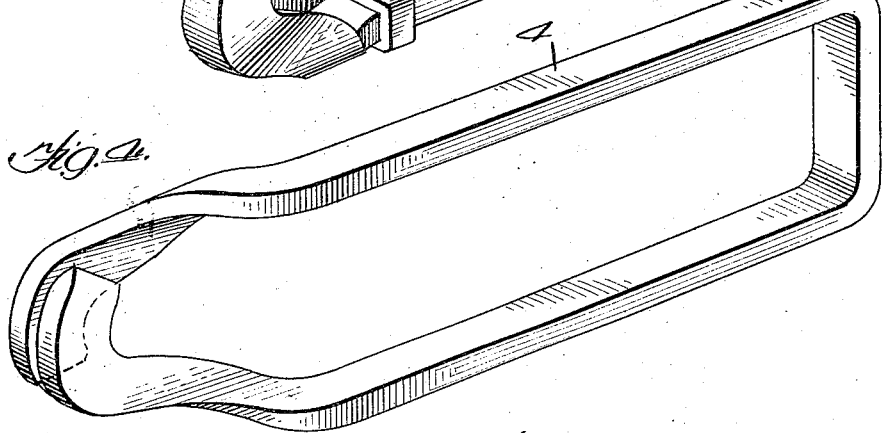
Figure 5:
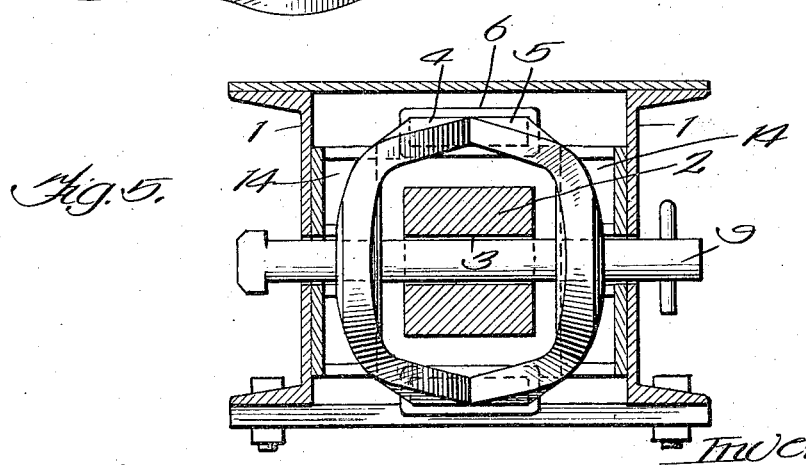

The invention will be more fully explained by reference to the accompanying drawings showing the preferred embodiment thereof and in which Fig. 1 is a plan view illustrating a draft gear employing a coupler and a yoke which is made in accordance with the preferred embodiment of the invention; Fig. 2 is a sectional view on line 2—2 of Fig. 1; Fig. 3 is a perspective view of a complete yoke; Fig. 4 is a perspective view of one of the component links of the yoke, illustrating a step in the process of its formation; and Fig. 5 is a sectional view on line 5—5 of Fig. 1.

Like parts are indicated by similar characters of reference throughout the different figures.

The draft gear illustrated is disposed between two center or draft sills 1. This draft gear employs a coupler having a stem 2 whose inner or abutting end is formed with a key slot 3. The coupler yoke is formed of two component links 4 and 5 which are similarly placed with their sides and inner ends held, edgewise, in engagement by any suitable means such as the strap 6 at the outer end of the yoke and the assembling plate 7 fastened to the inner end of the links by the rivets 8. Said component links are desirably made of bars of iron that are oblong in cross section, the wide faces of the sides of the links being horizontal or extending transversely of the gear, the wide faces of the inner ends of the links also preferably extending transversely of the gear. The component links are spread apart at their outer ends laterally of the gear to form the bifurcation in the outer end of the yoke that is constituted of said links. The spread apart link ends are desirably twisted to have their wide faces upright at the outermost end of the yoke to strengthen this part of the gear which is engaged by the key 9 that is passed through the key slot 3 and through the outer end of the yoke opening for the purpose of assembling the coupler yoke and stem, to enable the stem to exert pulling effort upon the yoke. Each component link is preferably made endless by overlapping the ends of the bar of which it is made and scarf welding these overlapping ends, Fig. 4.

Any suitable means for resisting the motion of the coupler due to draft strains may be employed. In the embodiment of the invention illustrated this motion resisting mechanism is inclusive of an outer follower 10, an inner follower 11, springs 12 within said followers that are made hollow for the purpose of receiving said springs, and interacting rockers 13 that are fulcrumed upon the followers and are acted up by the springs. The inner end of the coupler stem serves as a coupler butt to press the outer follower 10 inwardly while the inner end of the coupler yoke serves to pull the inner follower outwardly. Cheek plates 14 are secured to the center sills and are engageable with the followers as illustrated in accordance with well known practice.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A draft gear including a coupler provided with a stem that is formed with a horizontal key slot extending transversely therethrough; a coupler yoke formed of two assembled similarly placed links made of bars that are oblong in cross section, the wide faces of the sides of the links being horizontal, the links being spread apart at their outer ends laterally of the gear and receiving the coupler stem therebetween, these spread apart link ends being twisted to have their wide faces upright at the outer end of the yoke; a key passing through the key slot in the coupler stem and through said links at their outer ends; and motion resisting mechanism surrounded by said yoke.

In witness whereof, I hereunto subscribe my name this 27th day of January A. D., 1922.

HERMAN C. PRIEBE.